United States Patent
Wang et al.

(10) Patent No.: US 12,043,010 B2
(45) Date of Patent: Jul. 23, 2024

(54) VULCANIZED RUBBER BOOT AND TRANSFER MOLDING MOLD, MANUFACTURING EQUIPMENT AND MANUFACTURING METHOD THEREOF

(71) Applicant: EAST ROCK UNION LIMITED, Beijing (CN)

(72) Inventors: Jue Wang, Beijing (CN); Yongjiang Zong, Beijing (CN)

(73) Assignee: EAST ROCK UNION LIMITED, Beijing (CN)

( * ) Notice: Subject to any disclaimer, the term of this patent is extended or adjusted under 35 U.S.C. 154(b) by 448 days.

(21) Appl. No.: 17/311,268

(22) PCT Filed: Aug. 30, 2019

(86) PCT No.: PCT/CN2019/103775
§ 371 (c)(1),
(2) Date: Jun. 4, 2021

(87) PCT Pub. No.: WO2020/114024
PCT Pub. Date: Jun. 11, 2020

(65) Prior Publication Data
US 2022/0016860 A1    Jan. 20, 2022

(30) Foreign Application Priority Data
Dec. 7, 2018   (CN) .......................... 201811495075.6

(51) Int. Cl.
*B29D 35/02*    (2010.01)
*B29C 45/02*    (2006.01)
(Continued)

(52) U.S. Cl.
CPC ....... *B29D 35/0018* (2013.01); *B29D 35/122* (2013.01); *B29K 2105/246* (2013.01)

(58) Field of Classification Search
CPC .... B29D 35/02; B29D 35/0018; B29C 45/02; B29C 2045/2714
See application file for complete search history.

(56) References Cited

U.S. PATENT DOCUMENTS 6,841,114 B2 *   1/2005   Fujiwara ................ B29C 45/38
425/557

FOREIGN PATENT DOCUMENTS

CN          2233682 Y   *   8/1996
CN          2233682 Y       8/1996
(Continued)

OTHER PUBLICATIONS

International Search Report and Written Opinion for related PCT App No. PCT/CN2019/103775 dated Nov. 26, 2019, 10 pgs. (partial translation).

*Primary Examiner* — Robert B Davis
(74) *Attorney, Agent, or Firm* — Procopio, Cory, Hargreaves & Savitch LLP

(57) ABSTRACT

The present invention provides a transfer molding mold for a vulcanized rubber boot, comprising: a combined tube mold, having an inner cavity corresponding to a tube of the rubber boot a last mold with partition elements, having a main body substantially corresponding to the tube of the rubber boot in shape, and two or more partition elements disposed on the main body, wherein the last mold is suitable for installation into the inner cavity of the tube mold to form a transfer molding cavity between the wall of the inner cavity of the tube mold and the outer surface of the last mold, and the transfer molding cavity is partitioned into two or more parts by the last mold and the tube mold; and a rubber injection guide plate suitable for installation to the top of the tube mold to guide injection of unvulcanized mixed rubber, comprising a plate body, wherein the plate body is provided with: a rubber injection port to be con- (Continued)

nected with an external injection head to inject the unvulcanized mixed rubber; and an annular rubber injection channel for introducing the externally injected unvulcanized mixed rubber into the transfer molding cavity in an annular distribution manner.

20 Claims, 18 Drawing Sheets

(51) Int. Cl.
*B29D 35/00* (2010.01)
*B29D 35/12* (2010.01)
*B29K 105/24* (2006.01)

(56) References Cited

FOREIGN PATENT DOCUMENTS

| | | | |
|---|---|---|---|
| CN | 101804686 A | * | 8/2010 |
| CN | 101804686 A | | 8/2010 |
| JP | 09-216256 A | * | 8/1997 |

* cited by examiner

VULCANIZED RUBBER BOOT AND TRANSFER MOLDING MOLD, MANUFACTURING EQUIPMENT AND MANUFACTURING METHOD THEREOF

CROSS-REFERENCE TO RELATED APPLICATIONS

This application is a U.S. National Stage entry of PCT Application No: PCT/CN2019/103775 filed Aug. 30, 2019, which claims priority to Chinese Patent Application No. 201811495075.6, filed on Dec. 7, 2018, the contents of which are incorporated herein by reference.

FIELD OF THE INVENTION

The present invention relates to a vulcanized rubber boot and a transfer molding mold, a manufacturing equipment and a manufacturing method thereof.

BACKGROUND OF THE INVENTION

Vulcanized rubber boots have been widely used in various industries, such as worker safety, firefighting, fishery, outdoor sports, and fashion, which have high requirements for waterproof performance. For some specific operating environments, the insides of vulcanized rubber boots may need to be lined with boot linings, especially boot linings with foam materials and thermal insulation materials.

However, it is difficult to achieve overall transfer molding of rubber materials in the manufacturing industry of vulcanized rubber boots at present due to the characteristic of poor flow characteristics, which is different from PVC materials or the like, and semi-automated production lines are dominant in the industry.

In a semi-automated production line, rubber sheets having predetermined shapes and thicknesses are manufactured by the processes of mixing, extrusion, calendering etc. A worker puts a boot lining on a last in the production line, and firmly applies the pre-manufactured rubber sheets of various shapes to the boot lining in a predetermined manner to form a tube of a vulcanized rubber boot. Depending on different processes, a pre-manufactured sole may be cemented to the tube of the vulcanized rubber boot before or after vulcanization to complete the overall manufacturing.

In order to detect air or water leakage, a special equipment is required to manually test the tube or the entire vulcanized rubber boot. Generally, since the tube is formed by manually stacking the rubber sheets, it is fairly common that the vulcanized rubber boot manufactured in this way has parts with water leakage. Some parts are difficult to repair in the subsequent process, so the scrap rate is quite high, which greatly increases the production cost of vulcanized rubber boots. Therefore, an improved production process for vulcanized rubber boots is required.

SUMMARY OF THE INVENTION

According to one aspect of the invention, there is provided a transfer molding mold for a vulcanized rubber boot, comprising: a combined tube mold, having an inner cavity corresponding to a tube of the rubber boot; a last mold with partition elements, having a main body substantially corresponding to the tube of the rubber boot in shape, and two or more partition elements disposed on the main body, wherein the last mold is suitable for installation into the inner cavity of the tube mold to form a transfer molding cavity between the wall of the inner cavity of the tube mold and the outer surface of the last mold, and the transfer molding cavity is partitioned into two or more parts by the last mold and the tube mold; and a rubber injection guide plate suitable for installation to the top of the tube mold to guide injection of to unvulcanized mixed rubber, comprising a plate body, wherein the plate body is provided with: a rubber injection port to he connected with an external injection head to inject the unvulcanized mixed rubber; and an annular rubber injection channel for introducing the externally injected unvulcanized mixed rubber into the transfer molding cavity in an annular distribution manner.

Preferably, the partition elements of the last mold comprise two partition plates, which extend from the last mold to the front side and the rear side, respectively.

Preferably, when the last mold is mounted into the tube mold, the two partition plates partition the transfer molding cavity into a left chamber and a right chamber.

Preferably, the tube mold comprises a left tube mold and a right tube mold that can be mounted to match each other; and the two partition plates partition the left chamber and the right chamber corresponding to the left tube mold and the right tube mold.

Preferably, the partition elements of the last mold comprise three partition plates, the first partition plate extends from the last mold to the rear side, and the second partition plate and the third partition plate extend from the last mold to the left side and the right side, respectively.

Preferably, when the last mold is mounted into the tube mold, the three partition plates partition the transfer molding cavity into three chambers: a middle chamber, a left chamber and a right chamber.

Preferably the tube mold comprises three tube mold parts that can be mounted to match each other; and the three partition plates partition the middle chamber, the left chamber and the right chamber corresponding to the three tube mold parts.

Preferably, the partition elements of the last mold comprise a partition plate, a left step portion and a right step portion, the partition plate extends from the last mold to the rear side, and the left step portion and the right step portion respectively extend in the vertical direction on the left and right sides of the last mold.

Preferably, when the last mold is mounted into the tithe mold, the partition plate, the left step portion and the right step portion partition the transfer molding cavity into a middle chamber, a left chamber and a right chamber.

Preferably, the tube mold comprises a middle tube mold, a left tube mold and a right tube mold that can be mounted to match each other; and the partition plate, the left step portion and the right step portion partition the middle chamber, the left chamber and the right chamber corresponding to the middle tube mold, the left tube mold and the right tube mold.

Preferably, the left step portion and the right step portion of the last mold cooperate with the left side and right side of the middle tube mold to form the middle chamber; and the left tube to mold and the right tube mold surround the middle rear part of the last mold to cooperate with the partition plate to form the left chamber and the right chamber.

Preferably, the last mold further comprises a top step portion for closing the upper part of the middle chamber.

Preferably, the last mold and the middle tube mold further comprise lower step portions cooperating with each other to close the lower part of the middle chamber.

Preferably, the left tube mold and the right tube mold comprise step portions cooperating with the last mold and the middle tube mold to form closed left and right chambers.

Preferably, the left tube mold cooperates with the right tube mold to surround the middle tube mold and the last mold.

Preferably, the inner surface of the tube mold has features suitable for combining with a rubber surface.

Preferably, further comprising: a second last mold without partition elements, which is suitable for installation into the inner cavity of the tube mold.

Preferably, the second last mold has a shape corresponding to the tube of the rubber boot, so as to form a tube molding cavity between the wall of the inner cavity of the tube mold and the outer surface of the last mold without partition plates.

Preferably, the second last mold has a shape different from the tube of the rubber boot.

Preferably, the second last mold has an inflation channel adapted for connecting to an external pressurized gas source and an exhaust port formed on the surface thereof.

Preferably, the second last mold is provided with an airbag.

Preferably, the top of the tube mold and the bottom of the rubber injection guide plate have combining parts that cooperate with each other, and the rubber injection guide plate is suitable for being closed to the top of the tube mold through the combining parts.

Preferably, further comprising: an outsole mold, having an insole rubber injection port and an outsole mold cavity corresponding to the shape of the sole of the rubber boot, and configured to transfer mold the sole of the rubber boot, wherein the outsole mold has an insole combining part, and is adapted to be closed to the top of the tube mold and the top of the rubber injection guide plate through the outsole combining part.

Preferably, the plate body is further provided with a distribution chamber, and the distribution chamber is communicated with the rubber injection port through a rubber injection channel and communicated with the annular rubber injection channel through diversion channels.

Preferably, a plurality of diversion channels are provided, and each diversion channel connects the distribution chamber to the annular rubber injection channel; and preferably, four diversion channels are provided, which are spaced around the distribution chamber.

Preferably, the rubber injection port is disposed on a side of the plate body, and the distribution chamber is disposed inside the middle of the plate body.

Preferably, the annular rubber injection channel is an annular outlet formed at an end face of the plate body, and preferably, the shape circled by the annular outlet corresponds to the annular shape of the bottom of the tube of the rubber boot.

According to another aspect of the invention, there is provided a transfer molding equipment for a rubber boot, comprising: the transfer molding mold according to any one of the above aspects; a high-pressure injection mechanism for pressurizing and injecting prepared unvulcanized mixed rubber into the rubber injection port of the transfer molding mold; a mold moving mechanism for moving various parts of the transfer molding mold according to a preset program; and a control mechanism for controlling the operations of the mold moving mechanism and the high-pressure injection mechanism.

Preferably, the transfer molding equipment further comprises a heater for beating the unvulcanized mixed rubber.

According, to another aspect of the invention, there is provided a method for manufacturing a vulcanized rubber boot by using the transfer molding equipment according to the above aspects, comprising: moving the last mold with partition elements to the separated tube mold: closing the tube mold to accommodate the last mold at a proper position in the tube mold; positioning and fixing the rubber injection guide plate onto the top of the tube mold; injecting rubber into the rubber injection port of the rubber injection guide plate, and thereby injecting the unvulcanized mixed rubber into the transfer molding cavity between the tube mold and the last mold through the annular rubber injection channel of the rubber injection guide plate; opening the tube mold and withdrawing the last mold; covering the second last mold without partition elements by a boot lining, and moving the second last mold to the tube mold; closing the tube mold to accommodate the second last mold at a proper position in the tube mold; and vulcanizing the unvulcanized mixed rubber to form a tube of the rubber hoot.

Preferably, before vulcanizing the unvulcanized mixed rubber, the method further comprises the following steps: closing the outsole mold to the upper part of the rubber injection guide plate, and injecting rubber into the outsole rubber injection port of the outsole mold to form a sole; withdrawing the rubber injection guide plate from the tube mold, and closing the outsole mold with the tube mold; injecting pressurized air into the boot lining through an inflation channel in the second last mold to press the boot lining against the inner surface of the tube and applying pressure to the tube, and heating the tube and the second last mold by the heater at the same time, so that the unvulcanized mixed rubber is vulcanized, and the tube and the sole are vulcanized integrally to form a unitary vulcanized rubber boot.

Preferably, the method further comprises: an airbag is provided between the boot lining and the second last mold to apply pressure to the boot lining uniformly.

Preferably, the method further comprises: the second last mold has a shape different from that of the rubber boot.

Preferably, the method further comprises: withdrawing the outsole mold after vulcanization, opening the tube mold, and withdrawing the vulcanized rubber boot from the transfer molding equipment together with the second last mold.

Preferably, the method further comprises: separating the vulcanized rubber boot from the second last mold through an air pressure device.

According to another aspect of the invention, there is provided a unitary vulcanized rubber boot, transfer molded using the method according to the above aspects, comprising a tube, a sole and a boot lining molded by integral transfer molding.

Although the embodiments of the present invention are described to be applied to a transfer molding process, they are also applicable to an injection molding process; and the protection scope of the present invention is also intended to cover such applications.

BRIEF DESCRIPTION OF THE DRAWINGS

The present invention will be more fully understood through the following detailed descriptions and the accompanying drawings, in which similar elements are numbered in a similar manner, wherein.

DETAILED DESCRIPTION OF EMBODIMENTS

The technical solution of the present invention will be further described in detail below through embodiments and in combination with the accompanying drawings. But the present invention is not limited to the below embodiments.

In order to solve the problem that it is difficult to achieve injection-molded or transfer molded rubber boots (for example, integrally molded unitary vulcanized rubber boots) due to poor fluidity of rubber (for example, unvulcanized mixed rubber), the inventors of the present invention manufactured a rubber injection guide plate for guiding injection of unvulcanized mixed rubber; and in order to solve the problem that integrally molded vulcanized rubber boots with boot linings are difficult to achieve, the inventors of the present invention invented a relevant transfer molding mold, production line and production process. The integrally molded unitary vulcanized rubber boots produced by using the equipment or process also fall within the protection scope of the present invention.

As shown in FIGS. 1a-1d, according to one aspect of the present invention, a rubber injection guide plate for guiding injection of unvulcanized mixed rubber is provided, comprising a plate body. The plate body is generally square, and is made of a material suitable for manufacturing a high-pressure mold.

Figure 1A:
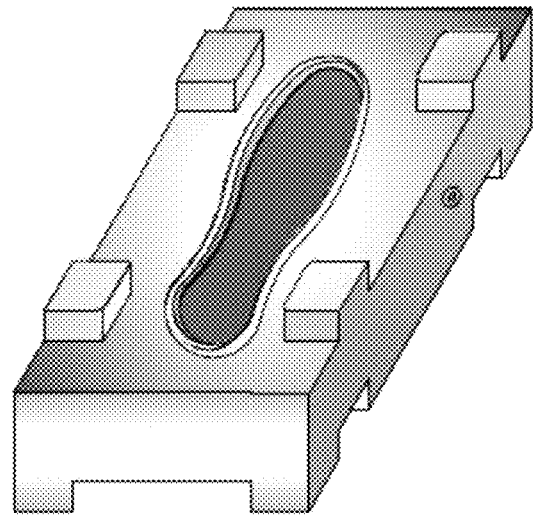
FIGS. 1a-1d are schematic diagrams of a rubber injection guide plate according to the present invention.
Figure 1B:
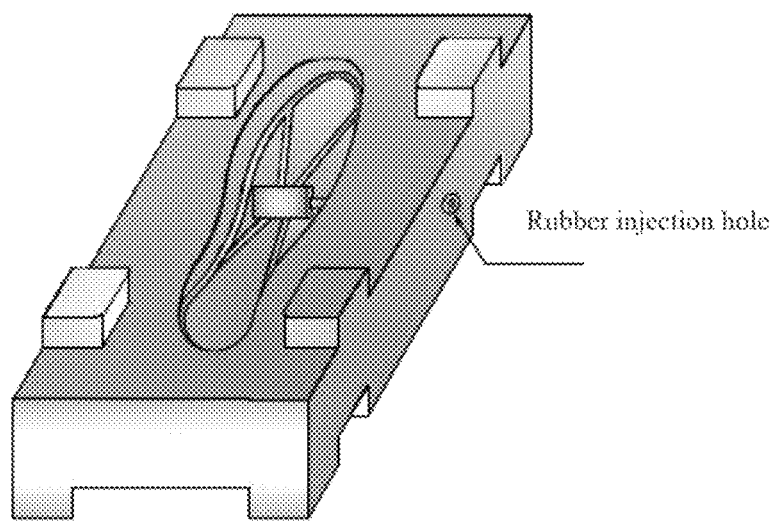
Figure 1C:
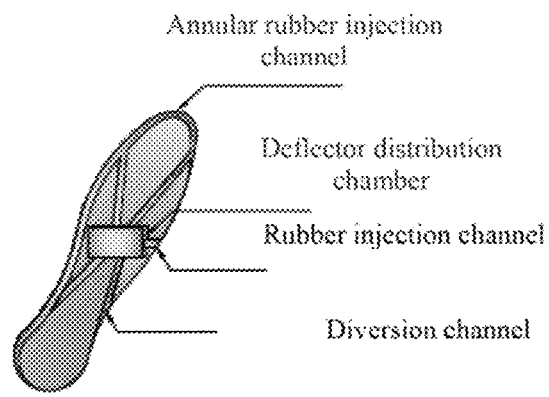
Figure 1D:
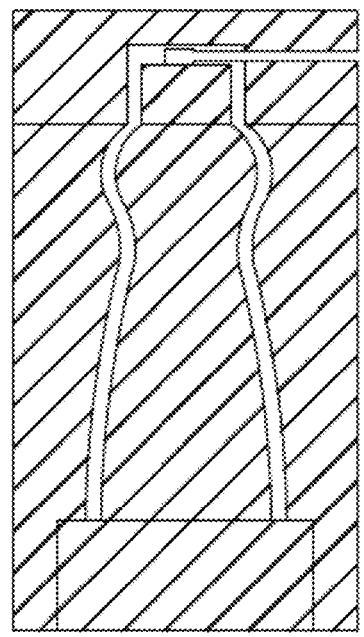

FIG. 1a shows an external structure of the rubber injection guide plate, FIG. 1b shows a schematic diagram of an internal structure of the rubber injection guide plate, FIG. 1c shows a schematic diagram of a cavity and channels of the rubber injection guide plate, and FIG. 1d shows a schematic diagram of combining of the rubber injection guide plate and other molds at a mounting position.

The plate body may be provided with a rubber injection port to be connected with an external injection head to inject unvulcanized mixed rubber, and an annular rubber injection channel for leading the externally injected unvulcanized mixed rubber out in an annular distribution manner. As shown in FIG. 1d, the unvulcanized mixed rubber led out from the annular rubber injection channel is introduced into other molds, such as a tube mold for producing rubber boots, which will be specifically described below.

The plate body may be further provided with a distribution chamber, and the distribution chamber is connected with the rubber injection port through the rubber injection channel and connected with the annular rubber injection channel through diversion channels. The distribution chamber can be more conducive to smoothly leading the unvulcanized mixed rubber out.

One or a plurality of diversion channels are provided, preferably a plurality of diversion channels are provided, and each diversion channel connects the distribution chamber to the annular rubber injection channel. Preferably, four diversion channels are provided, and distributed around the distribution chamber. The plurality of diversion channels help the unvulcanized mixed rubber to flow more smoothly from the distribution chamber to the annular channel, so as to reduce the pressure.

As shown in the figures, the rubber injection port may be disposed on a side of the plate body, and the distribution chamber is disposed inside the middle of the plate body.

As shown in FIG. 1a, the annular rubber injection channel is an annular outlet formed in the bottom of the plate body, and the shape circled by the annular outlet corresponds to the annular shape of the bottom of a tube of a vulcanized rubber boot.

In some embodiments, the annular rubber injection channel is formed as a continuous annular outlet. In some other embodiments, the annular rubber injection channel is formed as a discontinuous annular outlet, for example, the annular rubber injection channel has a plurality of circular port outlets evenly spaced apart. In these ways, the unvulcanized mixed rubber can be injected into the tube mold in an annular or substantially annular manner.

The guide plate may cooperate with other molds (such as a tube mold, or an outsole mold) to form a transfer molding mold for vulcanized rubber boots according to another aspect of the present invention.

Generally, the transfer molding mold for vulcanized rubber boots according to the present invention may include: a combined tube mold, having an inner cavity corresponding to a tube of a rubber boot; a last (or shoe tree) mold with partition elements, having a main body substantially corresponding to the tube of the rubber boot in shape, and two or more partition elements disposed on the main body, wherein the last mold is suitable for installation into the inner cavity of the tube mold to form a transfer molding cavity between the wall of the inner cavity of the tube mold and the outer surface of the last mold, and the transfer molding cavity is partitioned into two or more parts by the last mold and the tube mold; and a rubber injection guide plate suitable for installation onto the top of the tube mold to guide injection of unvulcanized mixed rubber, comprising a plate body, wherein the plate body is provided with: a rubber injection port connected with an external injection head to inject the unvulcanized mixed rubber; and an annular rubber injection channel for introducing the externally injected unvulcanized mixed rubber into the transfer molding cavity in an annular distribution manner.

FIGS. 2a-2d show a tube mold, a last mold and an outsole mold that may cooperate with the guide plate according to an embodiment of the present invention.

In the embodiment shown in FIGS. 2a-2d, the combined tube mold comprises three parts: a left tube mold 25, a middle tube mold 26, and a right tube mold 24. These tube molds can be combined together to form a complete tube mold. The complete tube mold comprises a complete tube molding cavity corresponding to the tube of the rubber boot.

According to an embodiment of the present invention, the transfer molding mold comprises two types of last molds: a last mold 27 with partition elements, and a second last mold 21 or 22 without partition elements.

The second last mold 21 without partition elements refers to a second last mold not covered by a boot lining, and the second last mold 22 without partition elements refers to a second last mold covered by a boot lining. The boot lining may be a thick boot lining, such as a textile fabric, a foam material, a composite material of a textile fabric and a foam material, a composite material of a textile fabric and an insulation material, or a composite material of a textile fabric, a foam material and an insulation material. The manufacturing method according to the present invention is particularly advantageous for unitary vulcanized rubber boots with thick boot linings.

The partition elements of the last mold 27 according to this embodiment may comprise three partition plates, the first partition plate extends from the last mold 27 with partition plates to the rear side, and the second partition plate and the third partition plate extend from the last mold 27 with partition plates to the left side and the right side, respectively. The partition elements or partition plates may extend along the entire longitudinal direction (vertical direction in the figures) of the main body of the last mold 27.

When the last mold 27 with partition elements is mounted into the tube mold, the three partition plates partition the transfer molding cavity formed between the outer surface of the last mold and the inner surface of the rube mold into three chambers: a front chamber, a left chamber and a right chamber.

Figure 3:
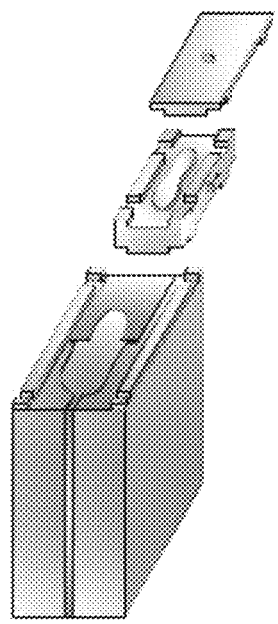
FIG. 3 is another schematic diagram of the transfer molding mold according to the present invention, showing a state of closing a tube mold.

Since the tube mold comprises three tube mold parts (the left tube mold 25, the right tube mold 26, and the rear tube mold 26 in the figures) that can be mounted to match each other, the three partition plates can partition the parts of the transfer molding cavity corresponding to the three tube molds. That is, as shown in FIG. 3, the three partition plates of the last mold 27 with partition elements are respectively located at the junctions of the three tube molds, so as to cooperate with each other to partition the transfer molding cavity into three chambers. FIG. 3 shows the situation that when the three tube molds are closed, they are combined with the last mold 27 with partition elements to form three partitioned chambers. The three partitioned chambers respectively correspond to the shapes of corresponding parts of the tube of the rubber boot, so that three separate tube parts can be formed during transfer molding of the rubber. The three separate tube parts can be combined in subsequent steps to form a complete tube.

Figure 5:
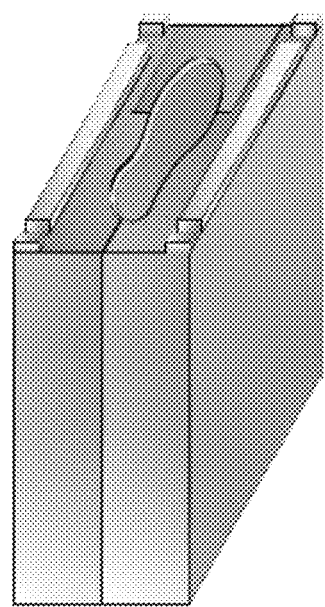
FIG. 5 is another schematic diagram of the transfer molding mold according to the present invention, showing another state of closed molds.

As described above, the transfer molding mold further comprises the second last mold 21 or 22 without partition elements, which is suitable for installation into the inner cavity of the tube mold. In a preferred embodiment, the second last mold may have a shape corresponding to the tube of the rubber boot, so as to form a complete tube molding cavity between the wall of the inner cavity of the tube mold and the outer surface of the second last mold without partition elements. The complete tube molding cavity corresponds to the tube of the rubber boot. FIG. 5 shows the situation that when the three tube molds are closed, they are combined with the second last mold 21 or 22 without partition elements to form a complete tube molding cavity.

In other embodiments, the second last mold may have a shape different from the tube of the rubber boot. The main function of the second last mold is to support the boot lining. The second last mold may have an inflation channel connected to an external pressurized gas source and an exhaust port formed on the surface, which can exhaust external pressurized gas from the surface so as to push the boot lining to fit the tube, and apply certain pressure to the tube to help mutual connection of the separated pans of the tube.

In a preferred embodiment, the second last mold is provided with an airbag. The boot lining may be breathable, resulting in uneven application of pressure, so a layer of airbag is disposed between the boot lining and the second last mold to uniformly apply pressure to the boot lining and the tube. The airbag may surround the second last mold, for example.

According to the present invention, the top of the tube mold and the bottom of the rubber injection guide plate have combining parts that match each other, and the rubber injection guide plate is suitable for being closed to the top of the tube mold through the combining parts. For example, protruding blocks shown in FIGS. 1a and 1b can be matched to corresponding recessed portions on the top of the tube mold. Other combining elements may also be available.

According to the present invention, the transfer molding mold may further comprise an outsole mold 23, which has an outsole rubber injection port and an outsole mold cavity corresponding to the shape of the sole of the rubber boot, and is used to transfer mold the sole of the rubber boot. The outsole mold 21 has an outsole combining part, and is suitable for being closed to the top of the tube mold or the top of the rubber injection guide plate through the outsole combining part when necessary.

Figure 2:
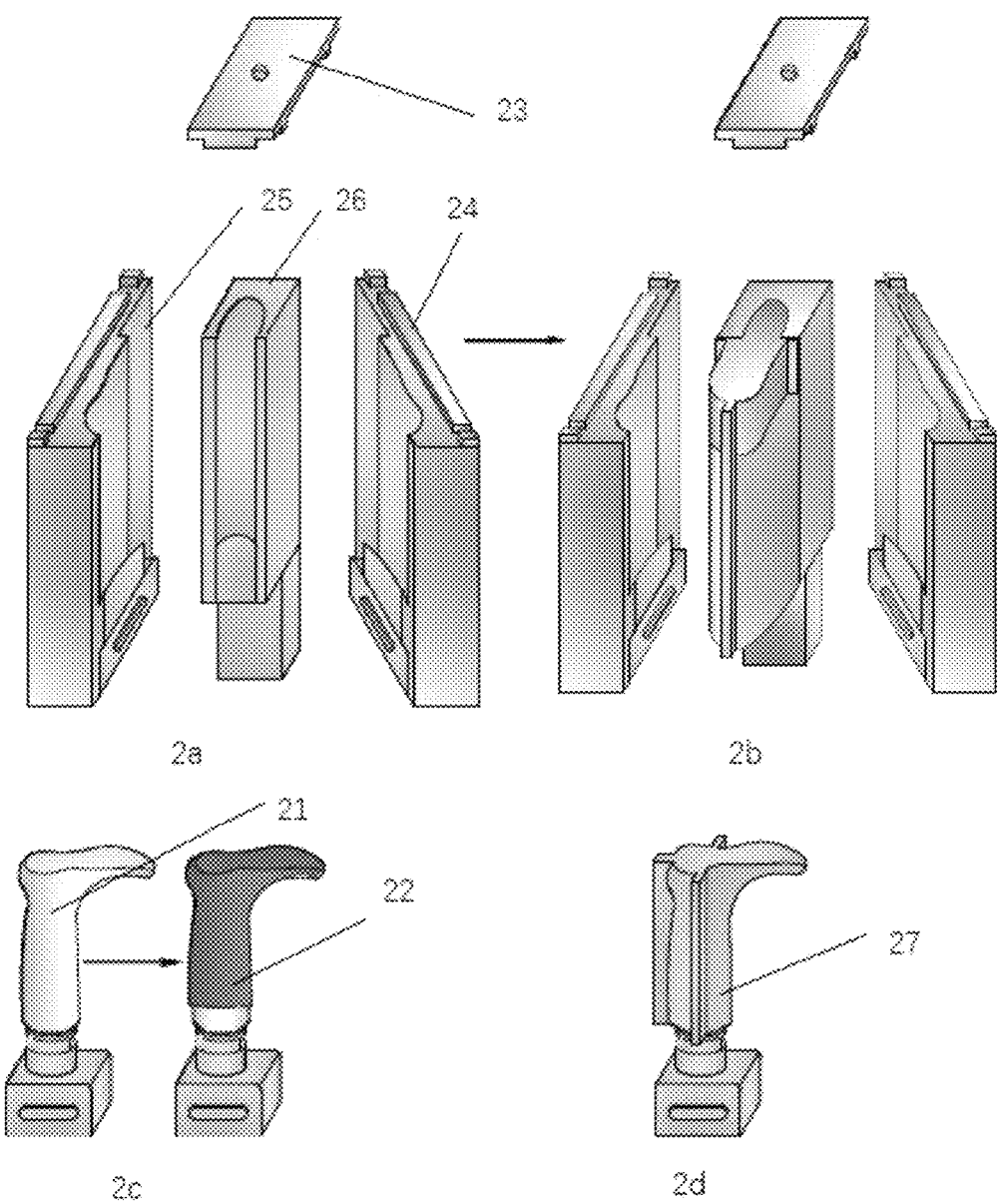
FIGS. 2a-2d are schematic diagrams of a transfer molding mold according to an embodiment of the present invention.
Figure 4:
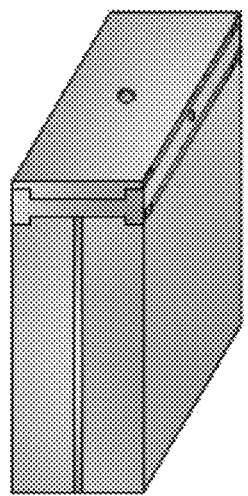
FIG. 4 is another schematic diagram of the transfer molding mold according to the present invention, showing a state of closed molds.

For example, protruding blocks on four sides of the top of the left tube mold and the right tube mold in FIG. 2a and recessed portions at the bottom of die guide plate in FIG. 1a can match each other, so that the guide plate and the tube mold can be accurately positioned with each other. FIG. 3 and FIG. 4 show the situations of partial combination and complete combination of the outsole mold, the guide plate, the tube mold, and the last mold with three partition plates.

Figure 6A:
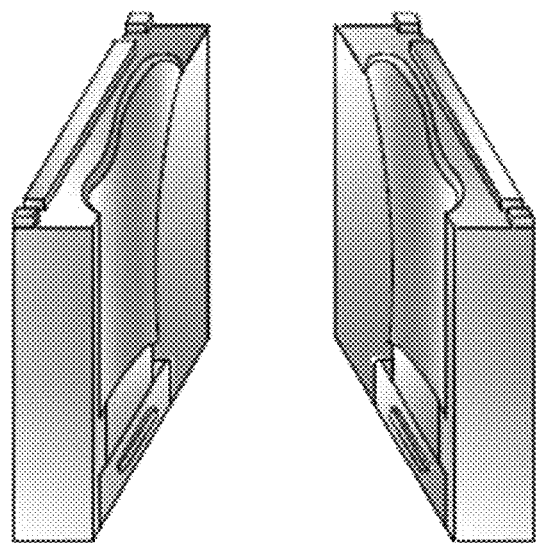
FIG. 6a-6c are schematic diagrams of a transfer molding mold according to another embodiment of the present invention.
Figures 6B, 6C:
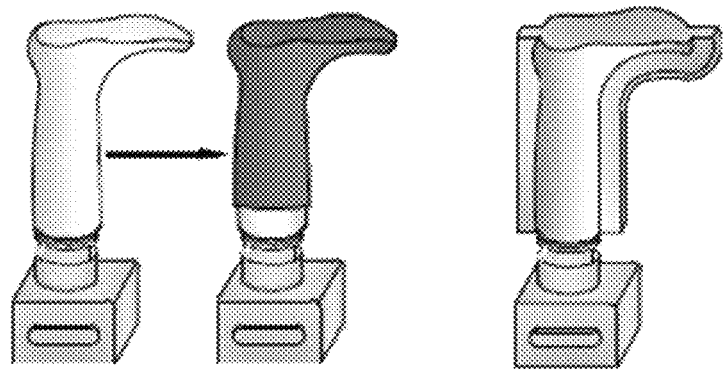

According to another embodiment of the present invention, for example, as shown in FIGS. 6a-6c, the partition elements of the last mold with partition elements may comprise two partition plates, which extend from the last mold with partition elements to the front side and the rear side, respectively. The partition elements or partition plates may extend along the entire longitudinal direction (vertical direction in the figures) of the main body of the last mold.

At this time, as shown in FIG. 6a, the tube mold may comprise a left tube mold and a right tube mold that can be mounted to match each other.

When the last mold with partition elements is mounted into the tube mold, the two partition plates partition the transfer molding cavity into two chambers.

The two partition plates partition the transfer molding cavity portions corresponding to the left tube mold and the right tube mold. The two partitioned chambers respectively correspond to the shapes of corresponding parts of the tube of the rubber boot, so that two separate tube parts can be formed during transfer molding of the rubber. The two separate tube parts can be combined in subsequent steps to form a complete tube.

Similar to the previous embodiment, the transfer molding mold of this embodiment may also comprise a second last mold without partition elements, which has a shape corresponding to the tube of the rubber boot, and is suitable for installation into the inner cavity of the tube mold to form a tube molding cavity between the wall of the inner cavity of the tube mold and the outer surface of the second last mold without partition elements. When the two tube molds are closed, they are combined with the second last mold without partition elements to form a complete tube molding cavity.

Figure 7:
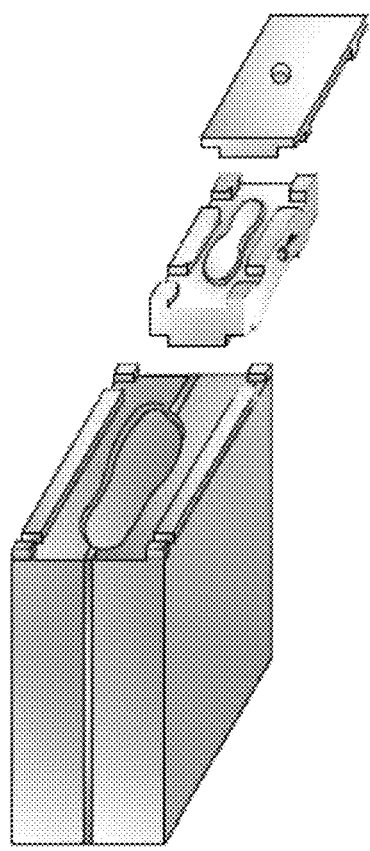
FIG. 7 is another schematic diagram of the transfer molding mold according to the present invention, showing a state of closing a tube mold.
Figure 8:
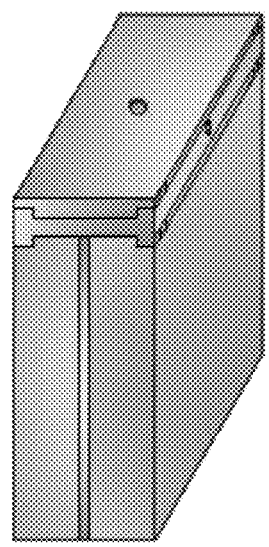
FIG. 8 is another schematic diagram of the transfer molding mold according to the present invention, showing a state of closed molds.
Figure 9:
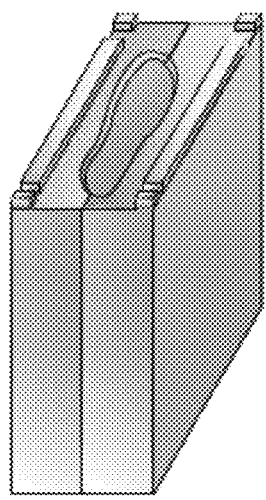
FIG. 9 is another schematic diagram of the transfer molding mold according to the present invention, showing another state of closed molds.

Similar to the previous embodiment, the transfer molding mold of this embodiment may also comprise an outsole mold. FIG. 7 and FIG. 8 show the situations of partial combination and complete combination of the outsole mold, the guide plate, the tube mold, and the last mold with two partition plates.

FIGS. 10-17 show a combined tube mold, a last mold with partition elements, etc. according to another embodiment of the present invention.

Figure 10A:
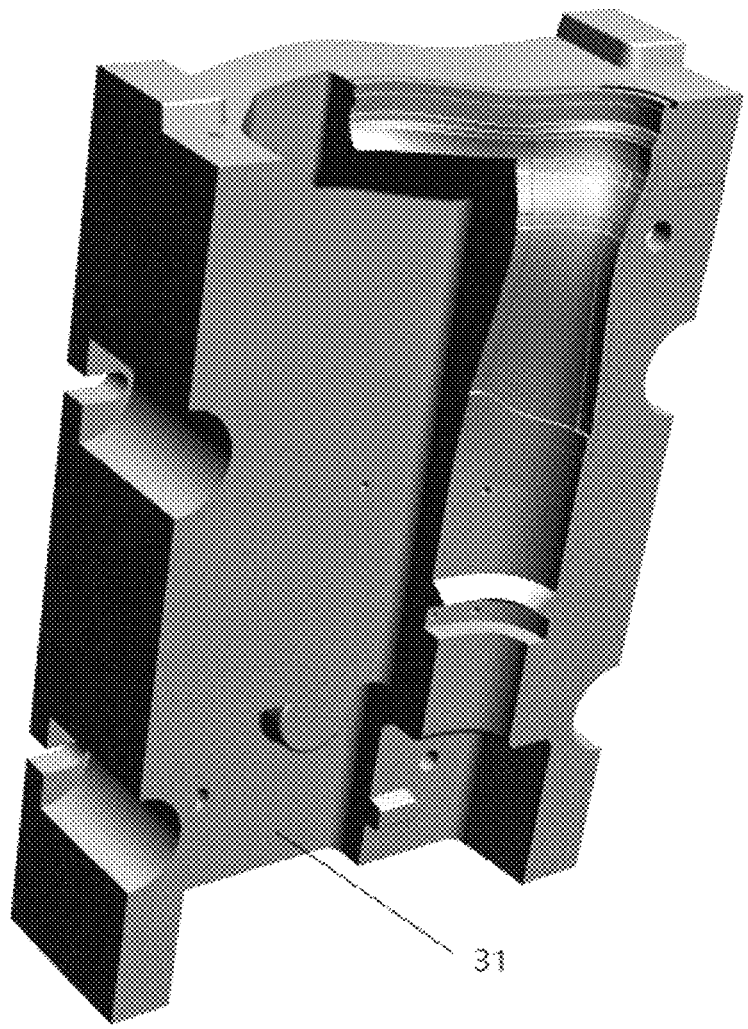
FIGS. 10a and 10b are schematic diagrams of a part of a tube mold of a transfer molding mold according to another embodiment of the present invention.
Figure 10B:
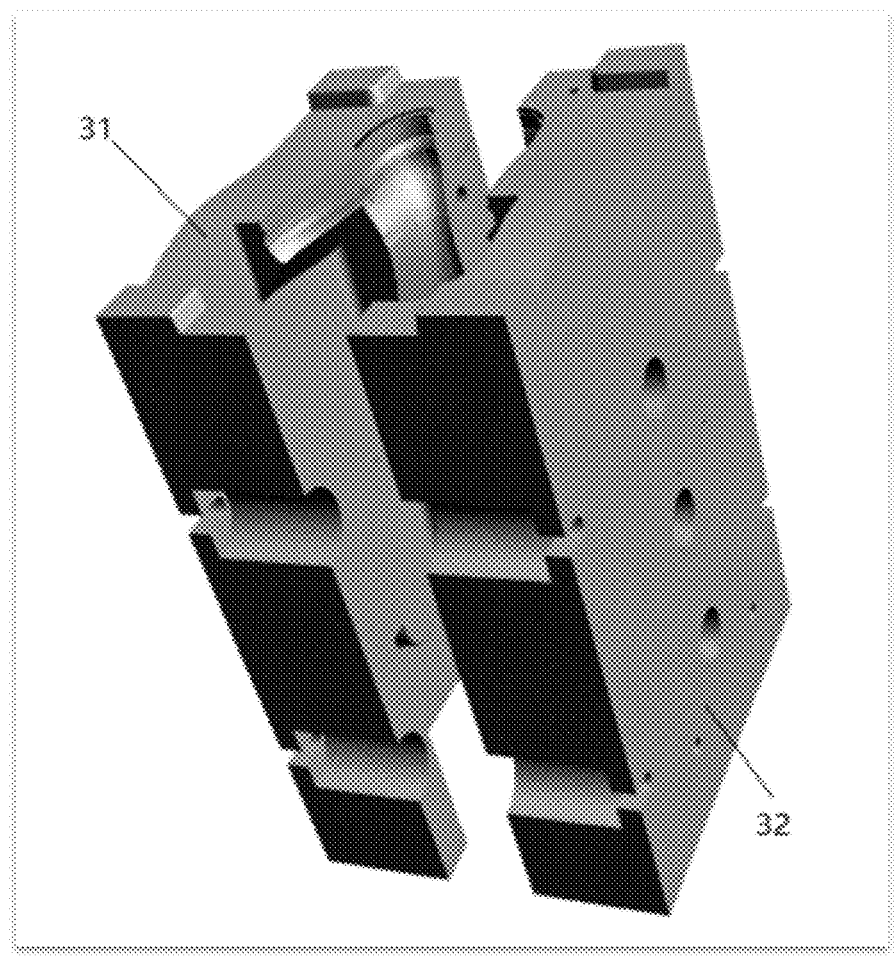
Figure 11:
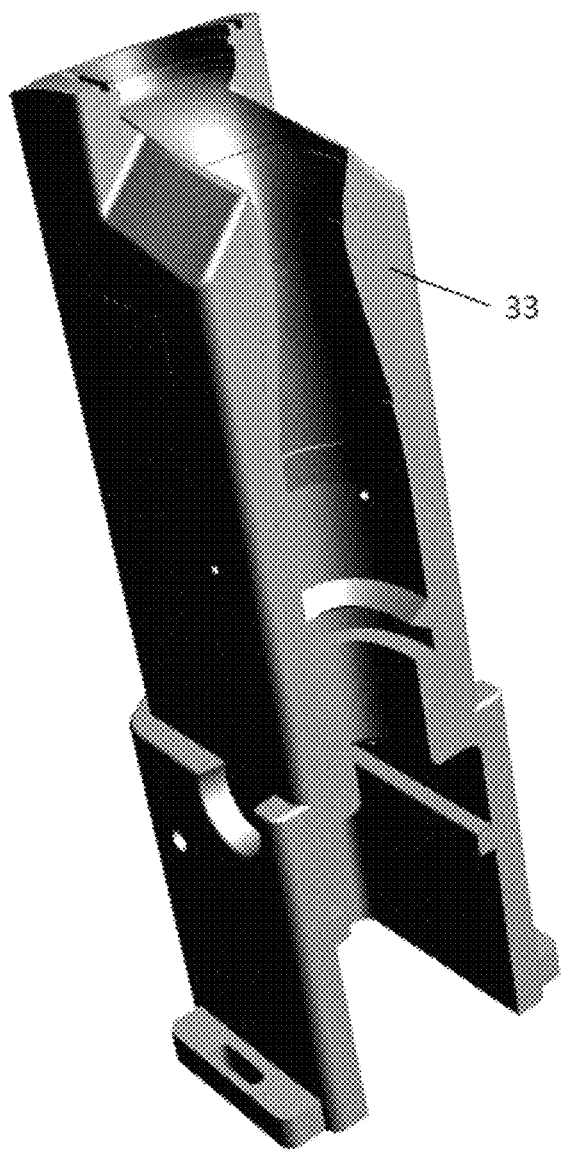
FIG. 11 is a schematic diagram of a part of a tube mold of a transfer molding mold according to another embodiment of the present invention.
Figure 12A:
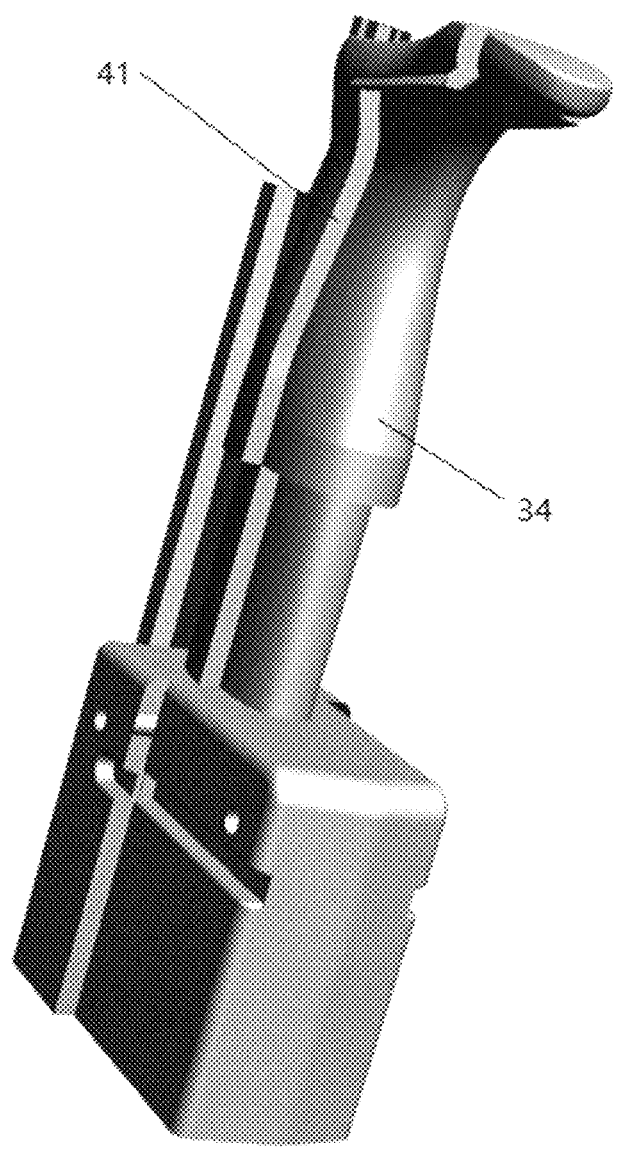
FIG. 12a-12c are schematic diagrams of a last mold with partition elements of the transfer molding mold according to another embodiment of the present invention.
Figure 12B:
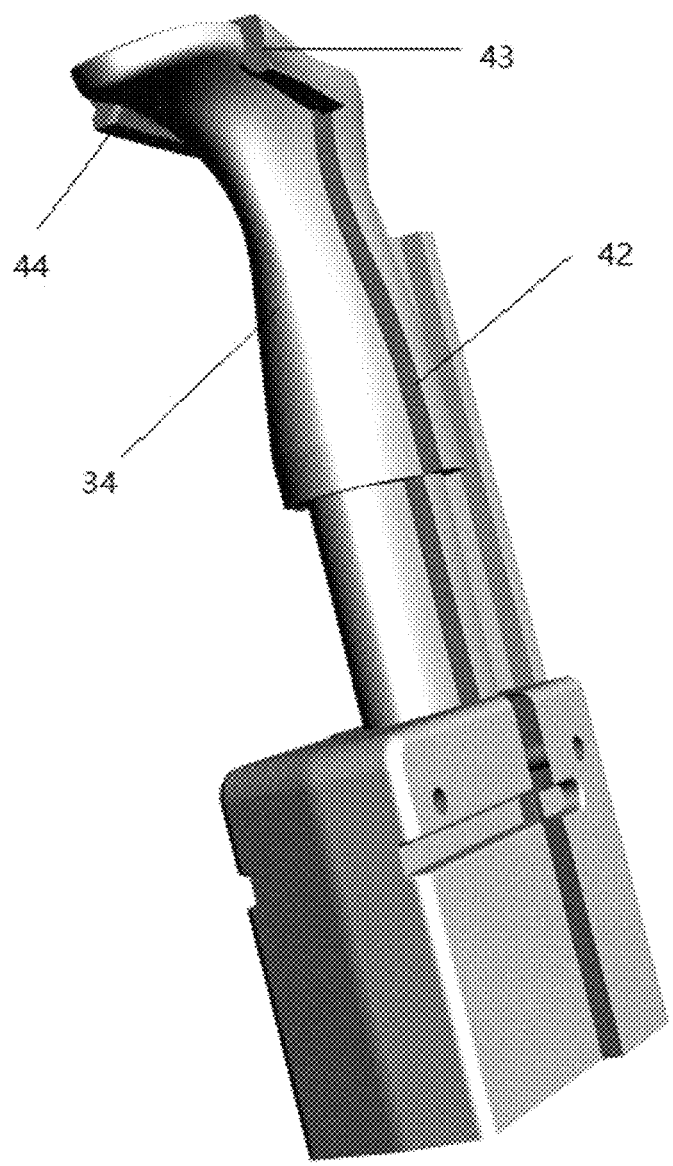
Figure 12C:
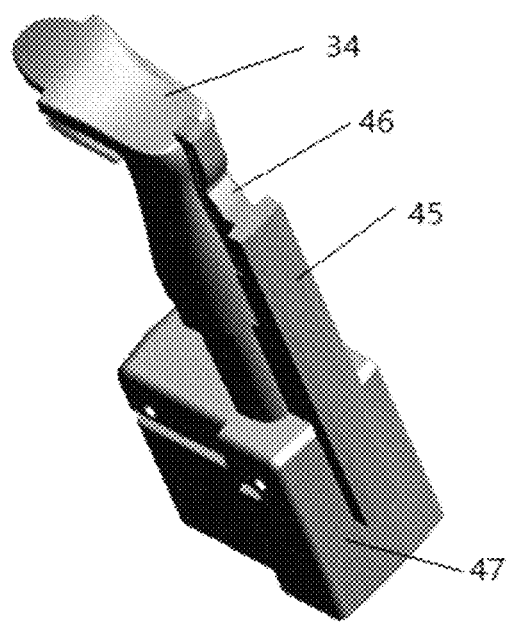
Figure 13:
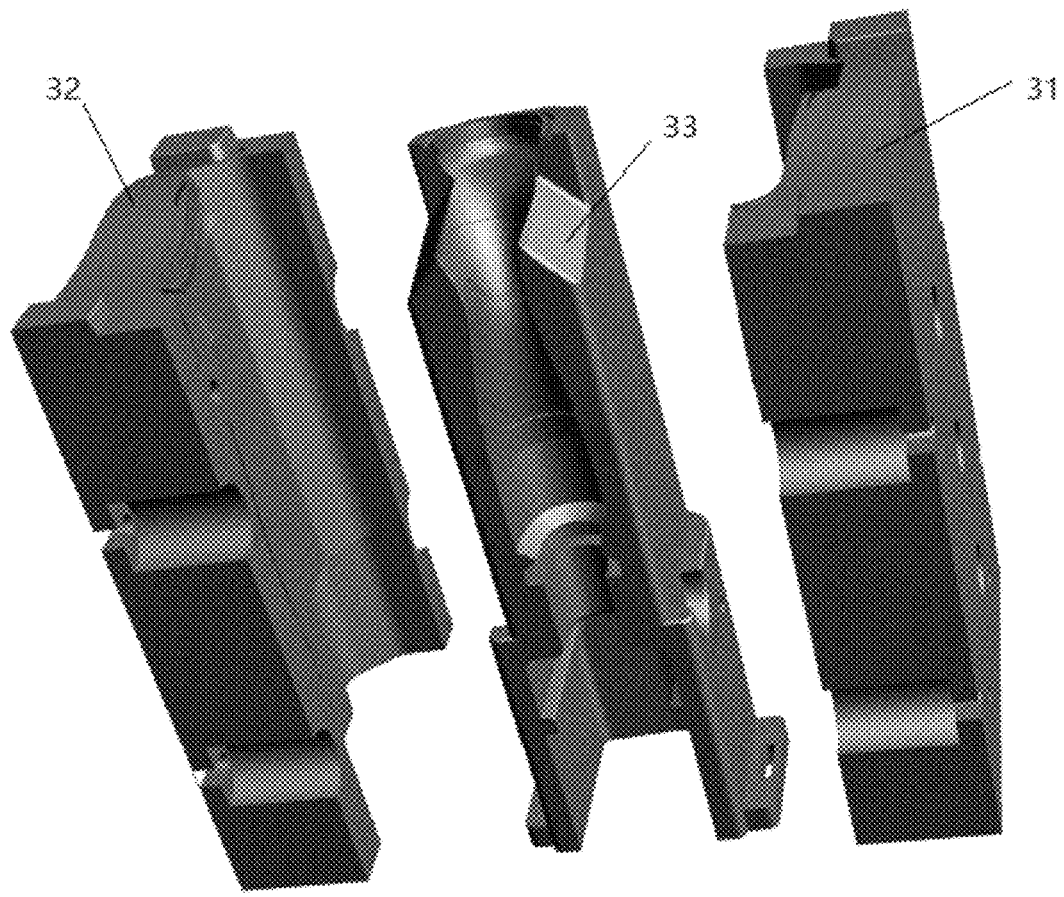
FIG. 13 is a schematic diagram of a tube mold of the transfer molding mold according to another embodiment of the present invention.

In this embodiment, as shown in FIGS. 10 and 11, the combined tube mold may comprise three parts: a left tube mold 31, a middle tube mold 33, and a right tube mold 32. These tube molds can be mounted closed) together to form a complete tube mold. The complete tube mold comprises a complete tube molding cavity corresponding to the tube of the rubber boot. These tube molds may also be closed with a last mold 34 with partition elements as shown in FIGS. 12a-12c to form three partitioned transfer molding cavities. The three partitioned transfer molding cavities correspond to the left rear part, the front part and the right rear part of the tube of the vulcanized rubber boot, respectively.

The transfer molding mold according to this embodiment may comprise two types of last molds: a last mold 34 with partition elements, and a second last mold without partition elements not shown, see other embodiments).

As shown in FIGS. 12a-c, the partition elements of the last mold 34 according to this embodiment may comprise a partition plate 45, a left step portion 41 and a right step portion 42, wherein the partition plate 45 extends from the last mold to the rear side, and the left step portion 41 and the right step portion 42 respectively extend in the vertical direction on the left and right sides of the last mold. The partition elements or partition plates may extend along the entire longitudinal direction (vertical direction in the figures) of the main body of the last mold 34. In this embodiment, the partition plate 45 comprises a recessed portion 46 for positioning. In other embodiments, the partition plate 45 may maintain a uniform width in the entire longitudinal direction.

According to this embodiment, the last mold 34 may further comprise top step portions 43 and 44 for closing the upper part of a middle transfer molding cavity formed by cooperation between the last mold 34 and the middle tube mold 33. The span of the top step portions 43 and 44 may be set as required. Alternatively, in other embodiments, the same function can be achieved by providing additional closing features, for example, the rubber injection guide plate may be provided with corresponding features.

Figure 14:
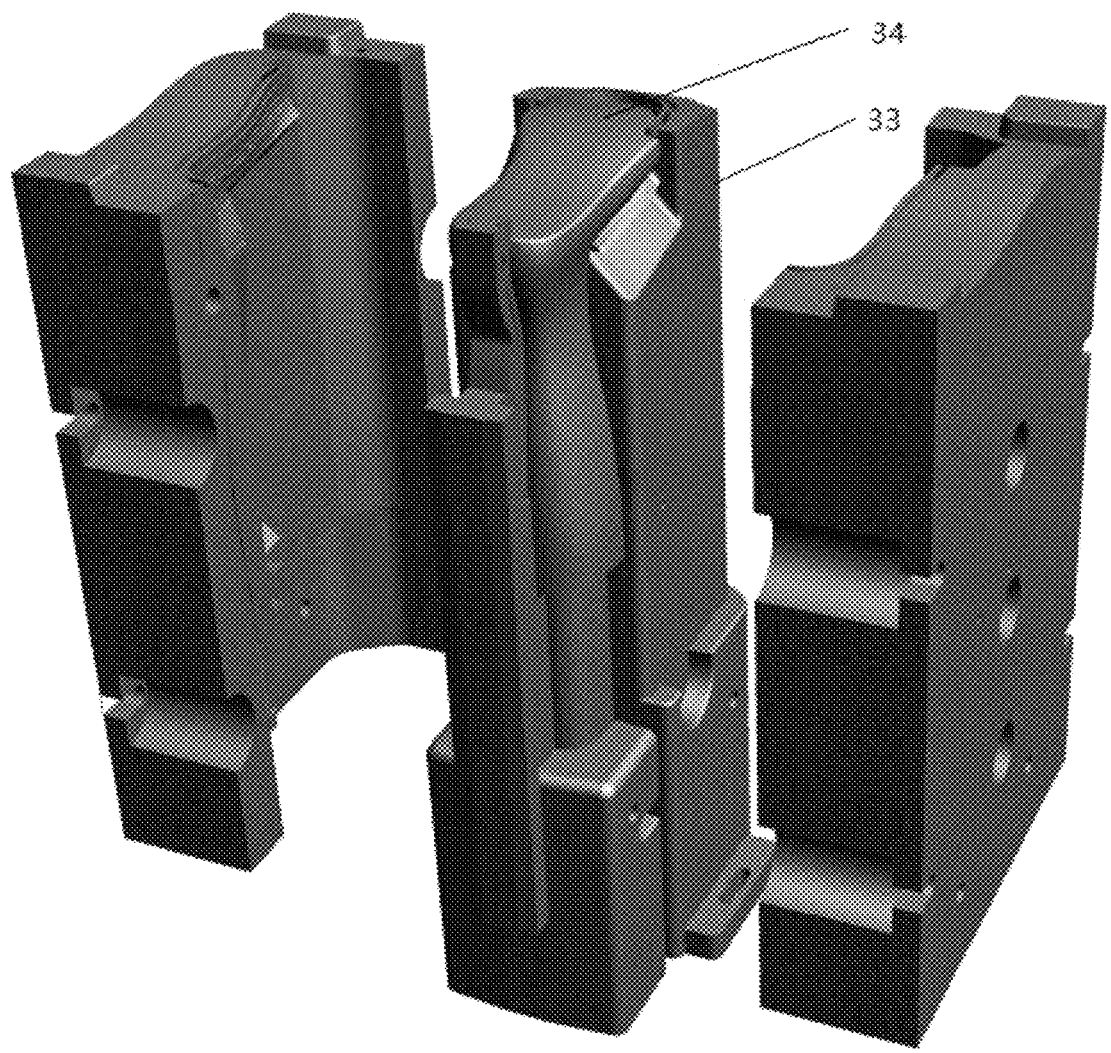
FIG. 14 and FIG. 15 are schematic diagrams of closing of the transfer molding mold according to the present invention.

When the corresponding operation is performed, the last mold 34 may be first combined with the middle tube mold 33, as shown in FIG. 14. The left step portion 41, the right step portion 42 and the top step portions 43 and 44 of the last mold 34 match corresponding parts (for example, left and right sides, and top step portions) of the middle tube mold 33, and the lower step portion of the last mold 34 matches the lower step portion of the middle tube mold 33, thus forming a closed middle transfer molding cavity portion.

Figure 15:
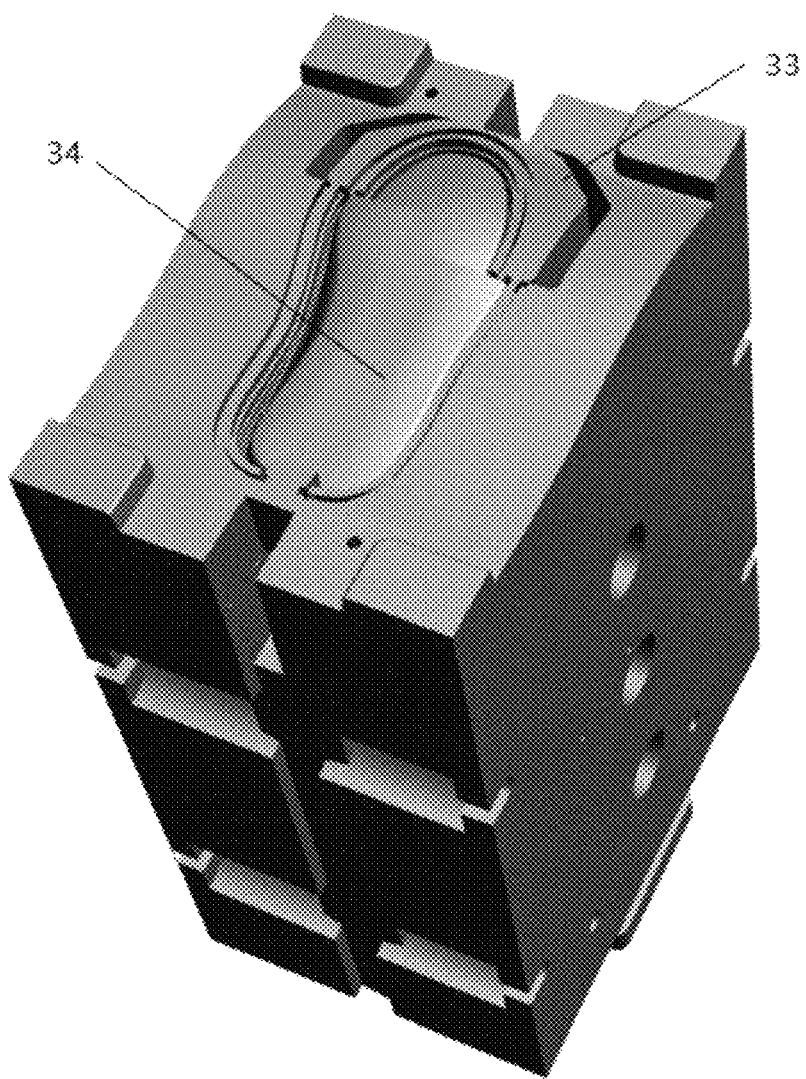

The left tube mold 31 and the right tube mold 32 can thereafter be combined with the last mold 34 and the middle tube mold 33 from both sides, and a closed left transfer molding cavity portion and a closed right transfer molding cavity portion are respectively formed between the left tube mold 31 and the last mold 34 and between the right tube mold 32 and the last mold 34. FIG. 15 shows the situation that the tube mold is completely closed.

In the presence of the partition plate and the step portions on the last mold 34, three partitioned chambers are formed: a left chamber, a middle chamber, and a right chamber. The three partitioned chambers respectively correspond to the shapes of corresponding parts of the tube of the rubber boot, so that three separate tube parts can be formed during transfer molding of the rubber. The three separate tube parts can be combined in subsequent steps to form a complete tube of a vulcanized rubber boot.

Similar to other embodiments, the transfer molding mold may further comprise a second last mold without partition elements. The second last mold without partition elements can be covered by a boot lining during the manufacturing process and moved into the tube mold after the last mold 34 is withdrawn.

In a preferred embodiment of the present invention, the second last mold may preferably have a shape similar to the tube of the vulcanized rubber boot, as described in the above embodiment. However, this is not necessary. Because the tube mold can be combined to form a complete tube molding cavity, the second last mold in other shape is covered by a boot lining and placed in the tube molding cavity. The boot lining can be attached to the inside of the tube formed by rubber by charging pressurized gas from the inside, and certain pressure is applied to the tube.

In a preferred embodiment, the second last mold is provided with an inflation channel to connect an external pressurized gas source. The surface of the second last mold may be provided with an air outlet to inflate the boot lining covering the second last mold so as to apply pressure from the boot lining, the boot lining is attached to the tube, and certain pressure may be applied to the tube. In a preferred embodiment, an inflatable airbag or an air-tight element having certain elasticity may be disposed between the boot lining and the second last mold to apply pressure to the boot lining uniformly under the action of pressurized gas.

Figure 16A:
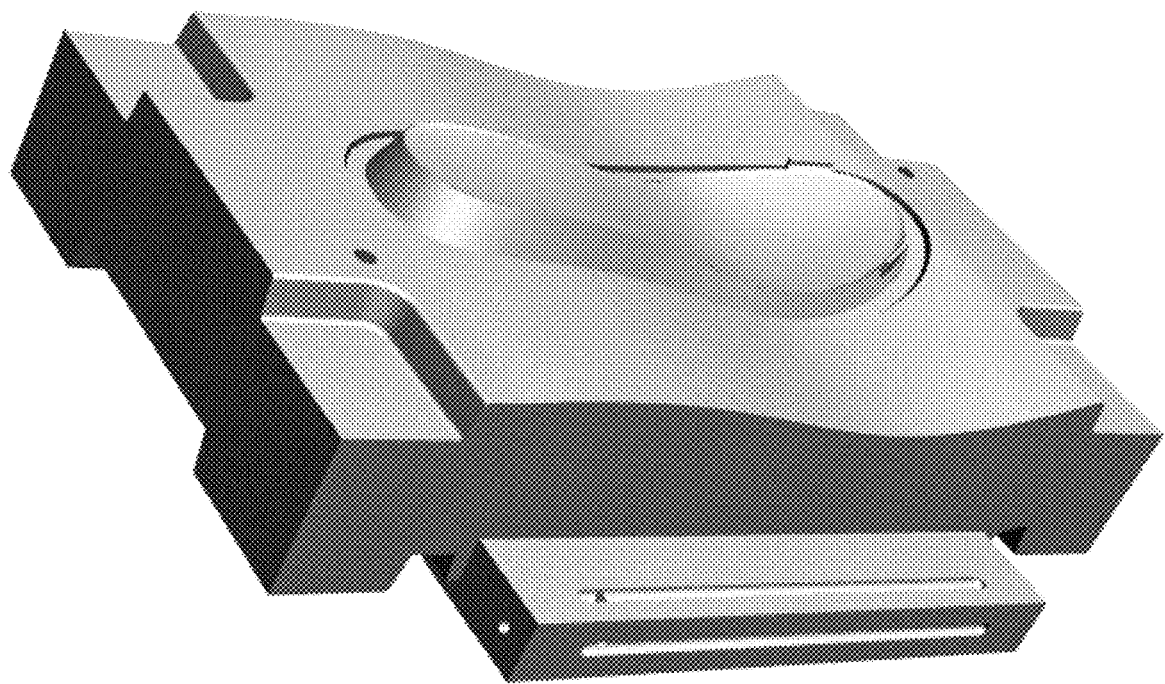
FIGS. 16a and 16b are schematic diagrams of a rubber injection guide plate according to another embodiment of the present invention.
Figure 16B:
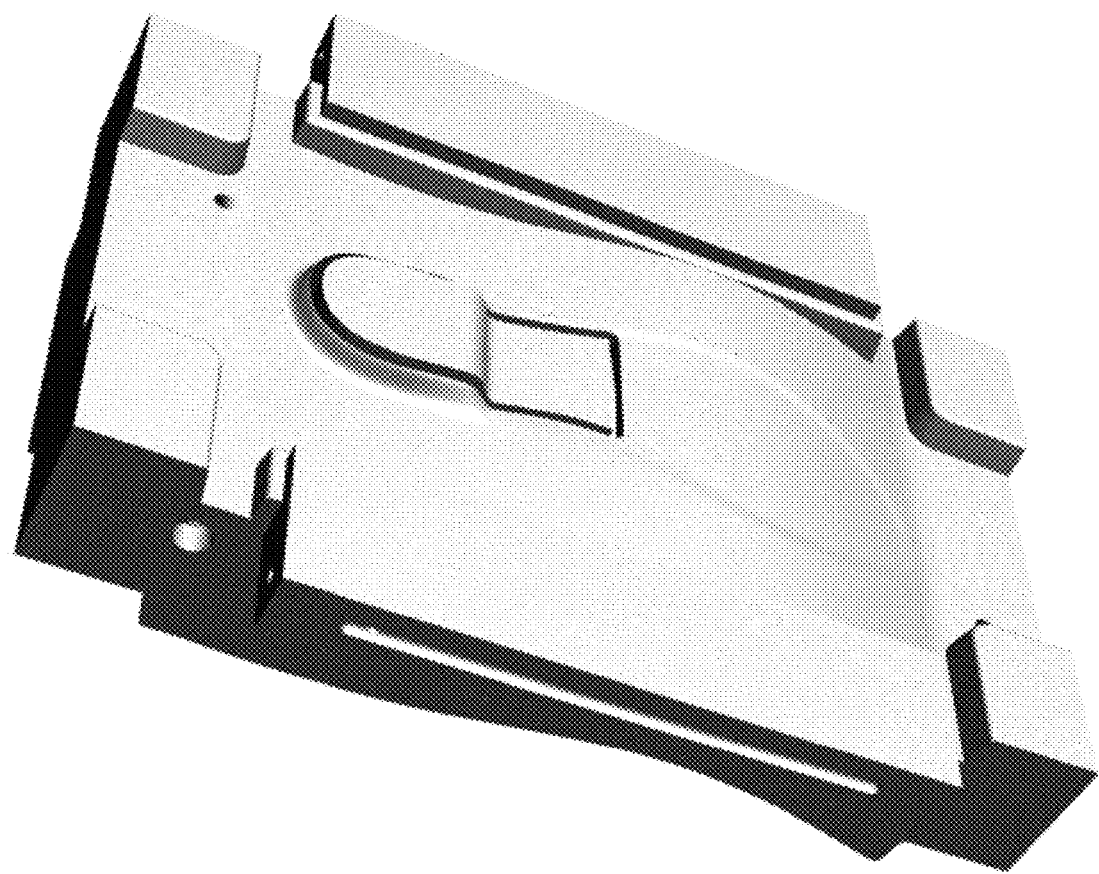

According to the present invention, the top of the tube mold and the bottom of the rubber injection guide plate have combining parts that match each other, and the rubber injection guide plate is suitable for being closed to the top of the tube mold through the combining parts. FIGS. 16a and 16b show three-dimensional diagrams of the rubber injection guide plate according to an embodiment of the present invention. FIG. 16a shows that one side may match the tube mold and the top of the last mold 34 to inject rubber, and FIG. 16b shows that one side may match the outsole mold to manufacture a sole of a rubber boot.

Figure 17:
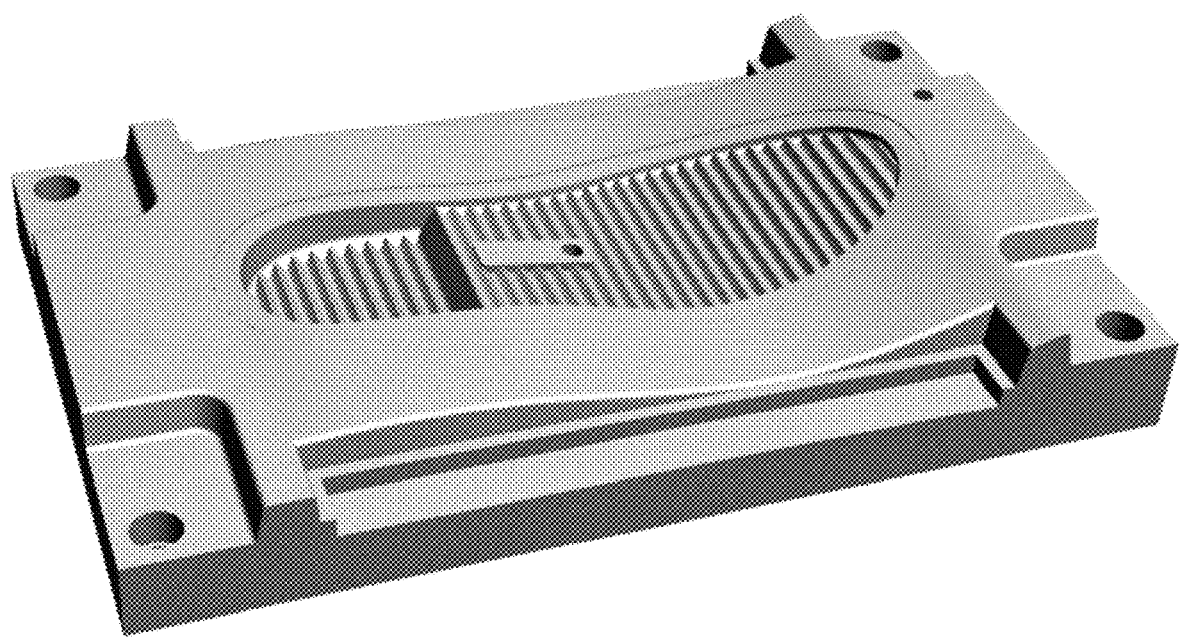
FIG. 17 is a schematic diagram of an outsole mold according to another embodiment of the present invention.

As shown in FIG. 17, according to the present invention, the transfer molding mold may further comprise an outsole mold, which has an outsole rubber injection port (not shown) and an outsole mold cavity corresponding to the shape of the sole of the rubber boot, and is used to transfer mold the sole of the rubber boot. The outsole mold has an outsole combining part, and is suitable for being closed to the top of the tube mold or the top of the rubber injection guide plate through the outsole combining part as required.

In the above embodiment, the left step portion and the right step portion of the last mold match the left side and right side of the middle tube mold to form a middle chamber; and the left tube mold and the right tube mold surround the middle rear part of the last mold to match the partition plate to form a left chamber and a right chamber. The last mold and the middle tube mold further comprise lower step portions matching each other to close the lower part of the middle chamber. The left tube mold and the right tube mold comprise step portions matching the last mold and the middle tube mold to form closed left and right chambers. The left tube mold matches the right tube mold to surround the middle tube mold and the last mold. The inner surface of the tube mold has features suitable for combining with a rubber surface, such as large roughness.

According to another aspect of the present invention, a transfer molding equipment for a rubber boot is provided, comprising: the transfer molding mold according to any of the above embodiments; a high-pressure injection mechanism for pressurizing and injecting the prepared unvulcanized mixed rubber into the rubber injection port of the transfer molding mold; a mold moving mechanism for moving various parts of the transfer molding mold according to a preset program; and a control mechanism for controlling the operations of the mold moving mechanism and the high-pressure injection mechanism.

The transfer molding equipment may further comprise a heater for heating the unvulcanized mixed rubber. For example, after the tube mold and the second last mold are closed so that several separate tube parts form a complete tube, or preferably after the insole is combined to the tube, the initially molded rubber boot is heated (and pressurized by other device) for vulcanization.

The operations of the transfer molding mold and the transfer molding equipment according to the present invention may refer to the following manufacturing method.

According to another aspect of the present invention, a method for manufacturing a vulcanized rubber boot by using the above transfer molding equipment is provided, for example, comprising the following steps:

1. Various parts of the tube mold are separated, and the last mold with partition elements is moved to be between various parts of the tube mold.

2. The tube mold is closed to accommodate the last mold with partition elements at a proper position in the tube mold; at this time, the molds can be fixed in place by proper positioning and clamping devices.

For example, the last mold with partition elements is positioned in the tube mold by engaging its partition elements or positioning steps with the positioning elements of the tube mold. An additional fixing device may be provided in the transfer molding equipment to fix the tube mold and the last mold in place. For example, a hydraulic positioning device may be provided.

3. The rubber injection guide plate is positioned and fixed to the top of the tube mold.

As described above, the lower part of the rubber injection guide plate and the top of the tube mold may be provided with positioning elements capable of engaging with each other. An additional fixing device may be provided in the transfer molding equipment to fix the rubber injection guide plate and the tube mold in place. For example, a hydraulic positioning device may be provided.

4. Rubber (unvulcanized mixed rubber) is injected into the rubber injection port of the rubber injection guide plate, and thereby injected into the transfer molding cavity between the tube mold and the last mold with partition elements through the annular rubber injection channel of the rubber injection guide plate.

The rubber injection mechanism may maintain high pressure to realize the injection process of unvulcanized mixed rubber. At this time, the annular outlet of the guide plate may guide the unvulcanized mixed rubber to the partitioned transfer molding cavity, which helps to reduce the pressure required for injection and distribute the unvulcanized mixed rubber to the transfer molding cavity uniformly. The unvulcanized mixed rubber in the rubber injection mechanism may be appropriately heated to improve its fluidity.

5. The tube mold is opened, and the last mold with partition elements is withdrawn.

At this time, since the unvulcanized mixed rubber is molded in the partitioned transfer molding cavity under the action of pressure and temperature, two or more separate parts of the tube are respectively formed. When the last mold with partition elements is withdrawn, these parts remain in continuous engagement with the corresponding parts of the tube mold. For example, this can be achieved by selecting the materials of the tube mold and the last mold with partition elements, for example, the inner surface of the tube mold is a rougher surface, etc.; or achieved by the temperature difference between the last mold and the tube mold; or achieved by providing features on the inner surface of the tube mold that are easily combined with the tube parts.

6. The second last mold without partition elements is covered by a boot lining and moved to the tube mold.

7. The tube mold is closed to accommodate the second last mold without partition elements at a proper position in the tube mold.

The positioning of the second last mold in the tube mold is similar to that of the above last mold.

At this time, the tube mold is closed, and presses the various parts of the tube and the boot lining together with the second last mold without partition elements to make them joint together.

Since the tube mold is combined, that is, comprises two, three or more parts, each part of the tube mold can be separated to place the last mold or the second last mold, and can be closed to match the last mold with partition elements to form separated transfer molding cavities, or to match the second last mold without partition elements to form a complete tube molding cavity. When the last mold with partition elements is withdrawn, the separated parts of the tube of the rubber boot formed are left on the various parts of the tube mold. After the second last mold with a boot lining is inserted and the various parts of the tube mold are, closed, the separated parts of the tube of the rubber boot thus formed can be combined to each other, and the boot lining can also be combined into the tube.

An inflation channel may be formed in the second last mold, an external gas source provides high-pressure gas, and pressured gas is provided to the surface of the second last mold after the mold is closed, so that the boot lining covering the surface of the second last mold is pressed to the inner surface of the tube of the rubber boot to promote mutual fit.

8. The unvulcanized mixed rubber is vulcanized.

For example, a heater is disposed near the mold to heat the closed mold so as to heat the tube and the second last mold, and the tube of the rubber boot is pressurized by the pressurized gas to perform vulcanization. At this time, all parts of the tube and the boot lining together form a complete tube.

In addition, before the unvulcanized mixed rubber is vulcanized, the method may further comprise the following steps:

The outsole mold is closed (for example, the outsole mold is closed to the top of the rubber injection guide plate), and rubber is injected into the outsole of the outsole mold to form a sole of the boot; the rubber injection guide plate is withdrawn from the tube mold, and the outsole mold is combined with the tube mold (so that the outsole is connected with the tube, and the boot lining is attached to the outsole and the tube). At this time, the unvulcanized mixed rubber is vulcanized, so that the overall tube, sole and boot lining are vulcanized to form a unitary vulcanized rubber boot.

The method may further comprise that: the outsole mold is withdrawn after vulcanization, the tube mold is opened, and the vulcanized rubber boot is withdrawn from the transfer molding equipment together with the second last mold without partition elements.

The method may further comprise that the vulcanized rubber boot is separated from the second last mold without partition elements through an air pressure device. For example, in the case where an inflation channel is formed in the second last mold, pressurized gas is directly provided to the second last mold.

According to another aspect of the present invention, a unitary transfer molded vulcanized rubber boot is provided, comprising a tube, a sole and a boot lining molded by integral transfer molding, wherein the tube has front and rear closing lines or the tube has left, right and rear closing lines.

Preferably, the unitary transfer molded vulcanized rubber boot is manufactured by the above method.

When the terms representing directions, such as "left", "center", "right", "front", "back", "middle", "upper" and "lower", are mentioned in the description, they are only to clearly represent relative positions, and are not intended to give any limitation. Generally, the directions are relative to the directions of the last mold.

The embodiments of the present invention are not limited to the above embodiments. Persons of ordinary skill in the art may make various changes and improvements to the present invention in form and details without departing from the spirit and scope of the present invention, and these changes and improvements are considered to be within the protection scope of the present invention.

The invention claimed is:

1. A transfer molding mold for a vulcanized rubber boot, comprising:
    a combined tube mold, having an inner cavity corresponding to a tube of the rubber boot;
    a last mold with partition elements, having a main body substantially corresponding to the tube of the rubber boot in shape, and two or more partition elements disposed on the main body, wherein the last mold is suitable for installation into the inner cavity of the tube mold to form a transfer molding cavity between a wall of the inner cavity of the tube mold and an outer surface of the last mold, and the transfer molding cavity is partitioned into two or more parts by the last mold and the tube mold; and
    a rubber injection guide plate suitable for installation to a top of the tube mold to guide injection of unvulcanized mixed rubber, comprising a plate body, wherein the plate body is provided with:
        a rubber injection port to be connected with an external injection head to inject the unvulcanized mixed rubber; and
        an annular rubber injection channel for introducing the externally injected unvulcanized mixed rubber into the transfer molding cavity in an annular distribution manner.

2. The transfer molding mold according to claim 1, wherein the partition elements of the last mold comprise two partition plates, which extend from the last mold to a front side and a rear side, respectively.

3. The transfer molding mold according to claim 2, wherein when the last mold is mounted into the tube mold, the two partition plates partition the transfer molding cavity into a left chamber and a right chamber.

4. The transfer molding mold according to claim 3, wherein the tube mold comprises a left tube mold and a right tube mold that can be mounted to match each other; and the two partition plates partition the left chamber and the right chamber corresponding to the left tube mold and the right tube mold.

5. The transfer molding mold according to claim 1, wherein the partition elements of the last mold comprise three partition plates, a first partition plate extends from the last mold to a rear side, and a second partition plate and a third partition plate extend from the last mold to a left side and a right side, respectively.

6. The transfer molding mold according to claim 5, wherein when the last mold is mounted into the tube mold, the three partition plates partition the transfer molding cavity into three chambers: a middle chamber, a left chamber and a right chamber.

7. The transfer molding mold according to claim 6, wherein the tube mold comprises three tube mold parts that can be mounted to match each other; and the three partition plates partition the middle chamber, the left chamber and the right chamber corresponding to the three tube mold parts.

8. The transfer molding mold according to claim 1, wherein the partition elements of the last mold comprise a partition plate, a left step portion and a right step portion, the partition plate extends from the last mold to a rear side, and the left step portion and the right step portion respectively extend in a vertical direction on the left and right sides of the last mold.

9. The transfer molding mold according to claim 8, wherein when the last mold is mounted into the tube mold, the partition plate, the left step portion and the right step portion partition the transfer molding cavity into a middle chamber, a left chamber and a right chamber.

10. The transfer molding mold according to claim 9, wherein the tube mold comprises a middle tube mold, a left tube mold and a right tube mold that can be mounted to match each other; and the partition plate, the left step portion and the right step portion partition the middle chamber, the left chamber and the right chamber corresponding to the middle tube mold, the left tube mold and the right tube mold.

11. The transfer molding mold according to claim 10, wherein the left step portion and the right step portion of the last mold cooperate with the left side and right side of the middle tube mold to form the middle chamber; and the left tube mold and the right tube mold surround a middle rear part of the last mold to cooperate with the partition plate to form the left chamber and the right chamber.

12. The transfer molding mold according to any one of claim 1, wherein the inner surface of the tube mold has features suitable for combining with a rubber surface.

13. The transfer molding mold according to any one of claim 1, further comprising:
    a second last mold without partition elements, which is suitable for installation into the inner cavity of the tube mold.

14. The transfer molding mold according to claim 13, wherein the second last mold has a shape corresponding to the tube of the rubber boot, so as to form a tube molding cavity between the wall of the inner cavity of the tube mold and the outer surface of the last mold without partition plates, wherein the second last mold has a shape different from the tube of the rubber boot.

15. The transfer molding mold according to claim 14, wherein the second last mold has an inflation channel adapted for connecting to an external pressurized gas source and an exhaust port formed on the surface thereof.

16. The transfer molding mold according to claim 15, wherein the second last mold is provided with an airbag.

17. The transfer molding mold according to claim 1, further comprising:
    an outsole mold, having an outsole rubber injection port and an outsole mold cavity corresponding to the shape of a sole of the rubber boot, and configured to transfer mold the sole of the rubber boot, wherein the outsole mold has an outsole combining part, and is adapted to be closed to the top of the tube mold and the top of the rubber injection guide plate through the outsole combining part.

18. The transfer molding mold according to claim 1, wherein the plate body is further provided with a distribution chamber, and the distribution chamber is communicated with the rubber injection port through a rubber injection channel and communicated with the annular rubber injection channel through diversion channels.

19. A transfer molding equipment for a rubber boot, comprising:
    the transfer molding mold according to claim 1;
    a high-pressure injection mechanism for pressurizing and injecting prepared unvulcanized mixed rubber into the rubber injection port of the transfer molding mold;
    a mold moving mechanism for moving various parts of the transfer molding mold according to a preset program; and
    a control mechanism for controlling operations of the mold moving mechanism and the high-pressure injection mechanism.

20. A method for manufacturing a vulcanized rubber boot by using the transfer molding equipment according to claim 19, comprising:
    moving the last mold with partition elements to a separated tube mold;
    closing the tube mold to accommodate the last mold at a proper position in the tube mold;
    positioning and fixing the rubber injection guide plate onto the top of the tube mold;
    injecting rubber into the rubber injection port of the rubber injection guide plate, and thereby injecting the unvulcanized mixed rubber into the transfer molding cavity between the tube mold and the last mold through the annular rubber injection channel of the rubber injection guide plate; opening the tube mold and withdrawing the last mold;
    covering a second last mold without partition elements by a boot lining, and moving the second last mold to the tube mold;
    closing the tube mold to accommodate the second last mold at a proper position in the tube mold; and vulcanizing the unvulcanized mixed rubber to form a tube of the rubber boot.

\* \* \* \* \*